US007236620B1

(12) United States Patent
Gurcan

(10) Patent No.: US 7,236,620 B1
(45) Date of Patent: Jun. 26, 2007

(54) COMPUTER-AIDED DETECTION METHODS IN VOLUMETRIC IMAGERY

(75) Inventor: Metin N. Gurcan, Beavercreek, OH (US)

(73) Assignee: ICAD, Inc., Nashua, NH (US)

( * ) Notice: Subject to any disclaimer, the term of this patent is extended or adjusted under 35 U.S.C. 154(b) by 805 days.

(21) Appl. No.: 10/600,783

(22) Filed: Jun. 20, 2003

Related U.S. Application Data

(60) Provisional application No. 60/391,120, filed on Jun. 24, 2002.

(51) Int. Cl.
*G06K 9/00* (2006.01)

(52) U.S. Cl. ............... 382/128; 382/168; 600/425; 378/4

(58) Field of Classification Search ........ 382/128, 382/129, 130, 131, 132, 133, 154, 173, 168–172, 382/193–194, 203, 209, 219, 224, 232, 256, 382/260, 274, 276, 289, 283–285, 305; 345/420; 600/407, 425; 378/4, 23, 25
See application file for complete search history.

(56) References Cited

U.S. PATENT DOCUMENTS

| | | | |
|---|---|---|---|
| 5,782,762 A | 7/1998 | Vining | |
| 5,920,319 A * | 7/1999 | Vining et al. | 345/420 |
| 6,083,162 A * | 7/2000 | Vining | 600/407 |
| 6,246,784 B1 * | 6/2001 | Summers et al. | 382/128 |
| 6,272,366 B1 | 8/2001 | Vining | |
| 6,345,112 B1 * | 2/2002 | Summers et al. | 382/128 |
| 6,366,800 B1 * | 4/2002 | Vining et al. | 600/425 |
| 6,470,092 B1 * | 10/2002 | Li et al. | 382/132 |
| 2002/0141627 A1 | 10/2002 | Romsdahl et al. | |

OTHER PUBLICATIONS

S.B. Gokturk, C. Tomasi, B. Acar, C. F. Beaulieu, D. S. Paik, R. B. Jeffrey, J. Yee, S. Napel, "A statistical 3-D pattern processing method for computer-aided detection of polyps in CT colonography," IEEE Trans. On medical Imaging, vol. 20, No. 12, pp. 1251-1260, 2001.

H. Yoshida, J. Nappi, "Three-dimensional computer-aided diagnosis scheme for detetion of detetion of colonic polyps," IEEE Trans. On Medical imaging, vol. 20, No. 12, pp. 1261-1274, 2001.

J. Nappi, A. H. Dachman, P. M. MacEneaney, H. Yoshida, "Computer-aided detection of polyps in CT colonography: evaluation of volumetric features in differentiating polyps from false positives," International Congress Series, vol. 1230, pp. 676-681, 2001.

R. M. Summers, A. K. Jerebko, M. Franaszek, J. D. Malley, "An Integrated system for computer-aided diagnosis in CT colonography: work in progress," International Congress Series, vol. 1230, pp. 669-675, 2001.

(Continued)

*Primary Examiner*—Seyed Azarian
(74) *Attorney, Agent, or Firm*—Dinsmore & Shohl LLP

(57) ABSTRACT

This invention provides a method for detecting abnormalities in medical images, particularly for the detection of polyps in the colon from computed tomography imagery. Specifically a set of colon masks is input to a detector where summations over spherical volumes with two different radii are computed. Abnormalities are detected based on the ratio of spherical summation values computed for every pixel location.

20 Claims, 7 Drawing Sheets

OTHER PUBLICATIONS

G. Kiss, J. V. Cleynenbreugel, M. Thomeer, P. Suetens, G. Marchal, "Computer-sided diagnosis in virtual colongraphy via combination of surface normal and sphere fitting methods," Eur. Radiol., vol. 12, pp. 77-81, 2002.

R. M. Summers, "Challenges for computer-aided diagnosis for CT colonography," Abdom. Imaging, vol. 27, pp. 268-274, 2002.

A. Oto, "Virtual endoscopy," European Journal of Radiology, vol. 42, pp. 231-239, 2002.

W. Luboldt, C. Mann, C. L. Tryon, R. Vonthein, D. Stueker, M. Kroll, O. Luz, C. D. Claussen, T. J. Vogl, "Computer-aided diagnosis in contrast-enhanced CT colonography: an approach based on contrast," Eur. Radiol., vol. 12, pp. 2236-2241, 2002.

R. M. Summers, A, K. Jerebko, M. Franaszek, J. D. Malley, C. D. Johnson, "Colonic polyps: complementary role of computer-aided detection in CT colonography," Radiology, vol. 225, pp. 391-399, 2002.

A. K. Jerebko, R. M. Summers, J. D. Malley, M. Franeszek, C. D. Johnson, "Computer-assisted detection of colonic polyps with CT colonography using neural networks and binary classification trees," Med. Phys., vol. 30, No. 1, pp. 52-60, 2003.

* cited by examiner

COMPUTER-AIDED DETECTION METHODS IN VOLUMETRIC IMAGERY

CROSS-REFERENCE TO RELATED APPLICATIONS

This application claims the benefit of U.S. Provisional Application No. 60/391,120, filed Jun. 24, 2002, incorporated herein by reference.

BACKGROUND OF THE INVENTION

1. Field of the Invention

This invention relates to a method and system for computer-aided detection (CAD) of volumetric images, specifically for detection of polyps indicative of colon cancer in computed tomography imagery.

2. Discussion of Background

Colorectal cancer is the second leading cause of cancer death in the United States. Each year approximately 150,000 people are diagnosed with colon cancer and 56,000 people die from it. Colonoscopic removal of identifiable polyps can considerably decrease the mortality. However, current screening methods of fiberoptic colonoscopy, flexible sigmoidoscopy, fecal occult blood testing and barium enema examination carry varying amounts of risk and may cause considerable discomfort to the patient, and therefore are not widely accepted by the general population. Recently, non-invasive virtual colonoscopy (VC) systems using computed tomography (CT) images were introduced as a colon cancer screening method and several commercial systems have been approved by the FDA.

In a VC system, prone and supine CT views of air-filled and cleansed colon are acquired and displayed in two dimensions (2D) and in three dimensions (3D). Two-dimensional displays are usually transverse images of CT slices as well as sagittal and coronal reformations. Three-dimensional displays could be volume renderings of suspicious regions or endoluminal representations.

Because of the large number of images that need to be examined in 2D views (300-700 images/patient) and the relatively long time it takes to do an endoluminal "fly-through," virtual colonoscopy interpretation can be quite time-consuming, typically ranging from 15 to 40 minutes when performed by experts in abdominal imaging. Additionally, the main task of identifying polyps can be challenging. Different studies report a large variation in sensitivity and specificity for the same dataset. This variation can be partly attributed to the operator's learning curve with the VC system. A CAD system can help users of VC systems by indicating the locations and reporting the characteristics of potential polyps. Such a system may increase the sensitivity while not decreasing the specificity.

It is therefore an object of this invention to provide a method and system for the automated detection of abnormal lesions in volumetric imagery.

SUMMARY OF THE INVENTION

In accordance with one aspect of the invention, a method of detecting abnormalities in digital imagery is provided comprising the steps of: providing a set of binary images derived from a plurality of slice images representing cross-sections through a body; performing a first spherical summation operation as a function of voxel locations in the set of images to provide a first spherical summation value; performing a second spherical summation operation as a function of the voxel locations in the set of images to provide a second spherical summation value; computing a ratio of the first spherical summation value to the second spherical summation value; and comparing the ratio to a threshold value and creating a set of detection images by turning voxels ON which exceed the threshold value.

Other objects and advantages of the invention will be apparent from the following description, the accompanying drawings and the appended claims.

DETAILED DESCRIPTION OF THE PREFERRED EMBODIMENTS

CAD systems typically follow a coarse-to-fine approach. That is, many potential abnormalities are found in an initial detection algorithm of relatively low computational complexity. Then, the initial detections are screened, and surviving detections are subjected to further more computationally expensive stages to successively prune spurious detections. Several CT CAD systems known in the art are described in U.S. Pat. Nos. 6,556,696; 6,466,687; 6,246,784; and published U.S. Patent Application 2002/0141627.

Figure 1:
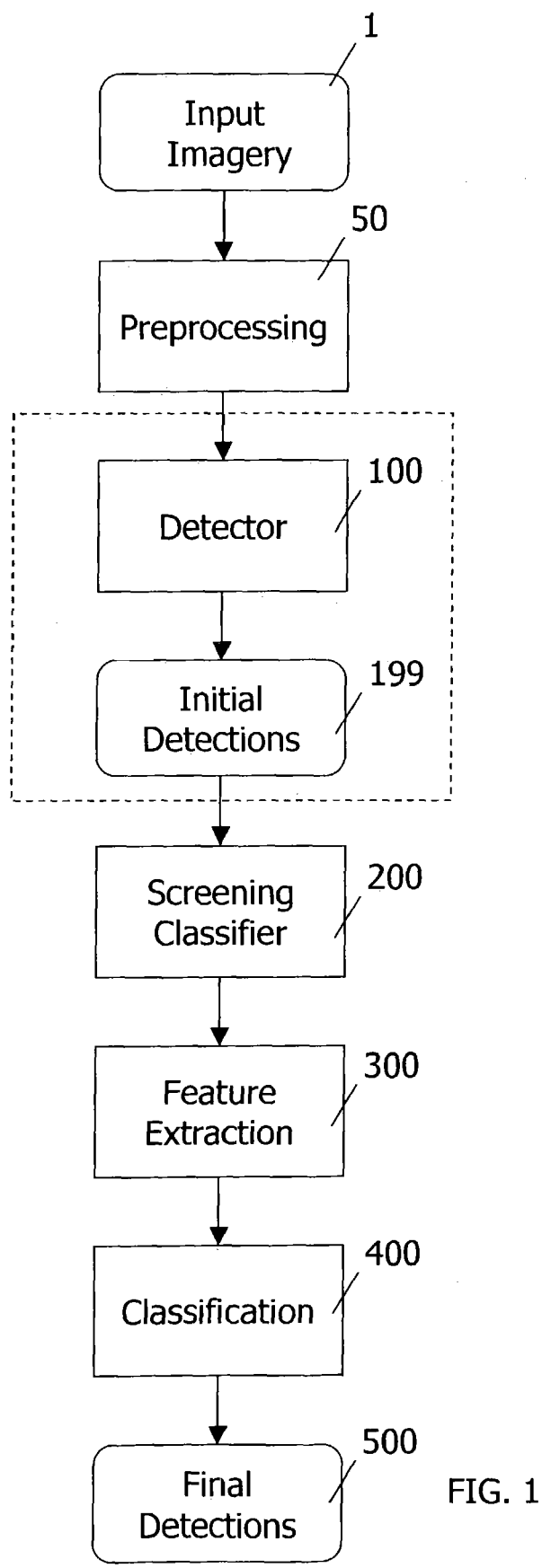
FIG. 1 is an overview of a computer-aided detection system incorporating the present invention.

Computer-aided detection systems are generally composed of the fundamental modules shown in FIG. 1. In a preprocessing stage, 50, the imagery, 1, may be cropped to reduce the amount of data to be processed and filtered to enhance the structures to be identified. In the next stage of a CAD system, a detector, 100, is applied. The purpose of the detector is to identify a set of initial detections, 199. A screening classifier, 200, reduces this set of initial detections to retain only those that are most likely to be of subsequent interest. The surviving detections are input to following feature extraction and classification stages, 300 and 400. Ultimately, the CAD system produces a set of final detections, 500. This invention presents a method for providing initial detections designated, 199 within the dashed box of FIG. 1.

The detection method of this invention is efficient to compute and is based on simple summations. Summation is an integral process and provides a degree of noise immunity. In contrast, detectors based on curvature calculations use derivative processes. Therefore, they are more susceptible to produce spurious outputs due to noise in the input imagery. Reduction of spurious outputs from the detector provides the benefits of decreased processing time in subsequent stages and potentially greater overall classification accuracy.

3-Dimensional Imagery

Assume the rectangular coordinate system with axes (i, j, k), where (i, j) are in the horizontal plane and k is oriented vertically upwards. A point in space can be identified by specifying an (x, y, z) values for the corresponding (i, j, k) directions. A volume of space may be considered to be comprised of solid rectangular volume elements, or voxels.

3-dimensional imagery is specified by providing a set of voxel values over a region of space. In a set of CT imagery, the k direction is typically oriented along the head-to-foot axis. A two-dimensional transverse image, or slice, is obtained by selecting a particular value of z, then retaining all voxel values in the (i, j) directions. Values in 2-dimensional images are referred to as pixels.

Segmentation

Voxel values in CT imagery are in Hounsfield units. Different types of tissue are represented within selected intervals of Hounsfield units. Furthermore, air-filled regions provide different values Hounsfield units than most regions of tissue. Since the colon is a hollow organ, and since it is inflated with air before the CT exam for virtual colonoscopy, it may be initially segmented in CT imagery by identifying voxels with values associated with air. In CT imagery, a mask may be used to identify objects of interest within the slice images. A mask is a binary image wherein locations of ON pixels indicate locations of tissue in the corresponding input image. Colon masks may be created by segmentation methods. Segmentation methods are known in the art, see for example Chen et al, U.S. Pat. No. 6,246,784 and published U.S. Patent Applications 2001/0055016 and 2001/0044576.

Detection

Figure 2:
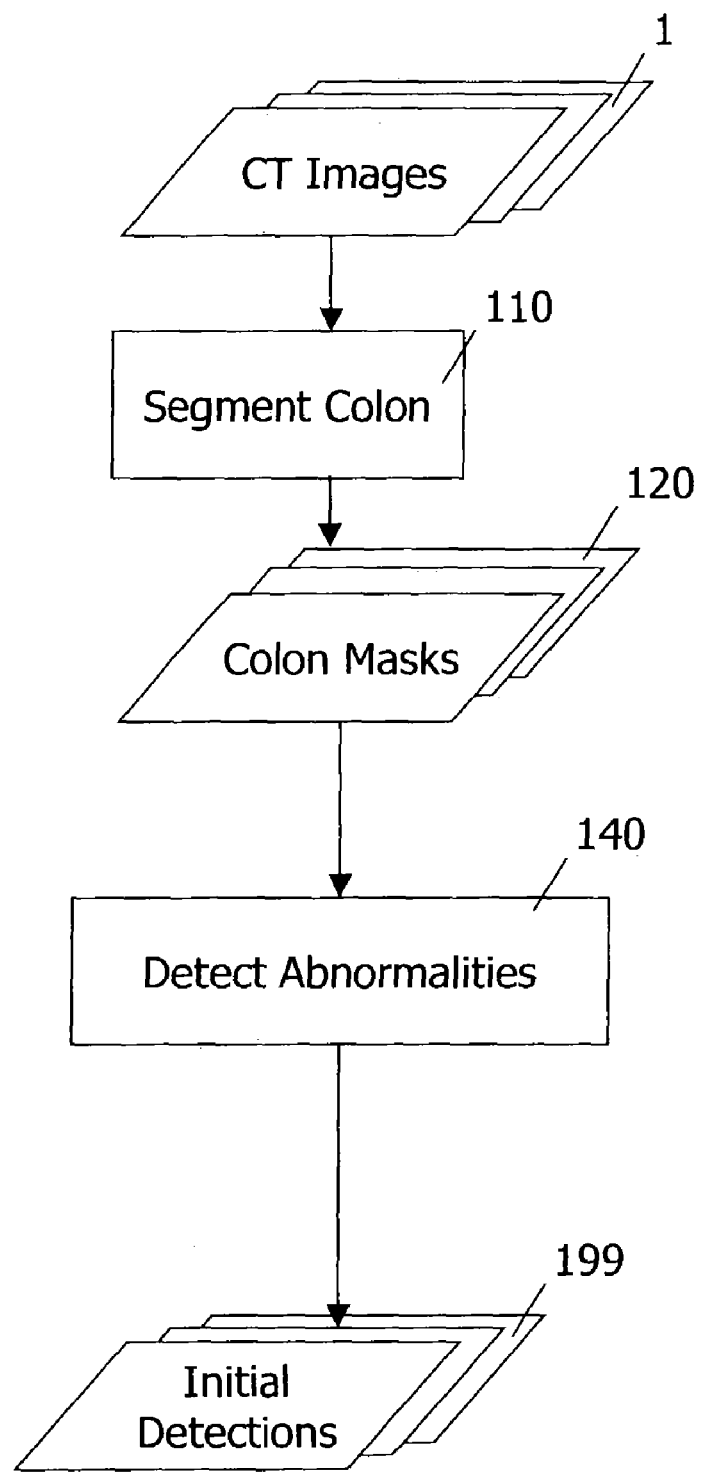
FIG. 2 shows the abnormality detector of the present invention.

An overview of the detection process is shown in FIG. 2. A set of CT images, 1, is input to step 110 where the colon is segmented. The segmentation step produces a set of binary colon masks, 120. The binary colon masks are input to step 140, where summations over spherical volumes with two different radii are computed. Abnormalities are detected based on a feature computed for every pixel location as a function of the spherical summation values. A set of initial detections, 199, is created based on the feature's value.

Figure 3:
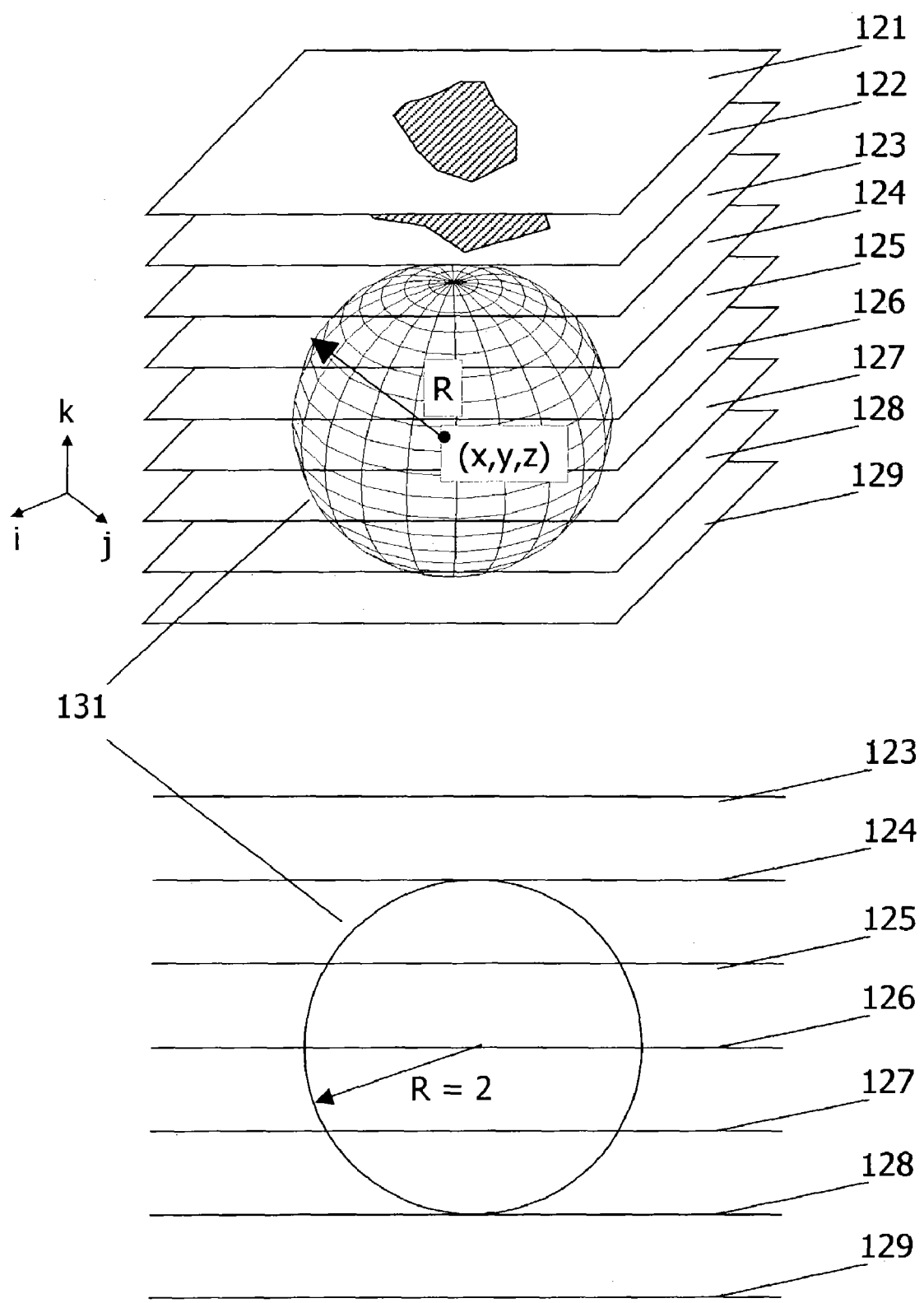
FIG. 3 illustrates the spherical summation operation.

FIG. 3 illustrates the application of the spherical summation operator. Let 121-129 represent binary colon masks. The shaded regions represent colon areas within the CT imagery and are assigned the value of −1. In FIG. 3, only masks 121 and 122 contain colon areas. Unshaded regions are outside the colon and are assigned the value of +1. A spherical template, 131 is centered at voxel location (x, y, z). In FIG. 3, z denotes the slice index, and the pair (y, x) denotes the row and column coordinates for the center of the spherical template. The sphere is shown centered at location (x, y) on mask 126. The radius, R, of the sphere in the illustrated example of FIG. 3 is equal to two units. Therefore, the summation involves masks 124 through 128. It should be understood that the detector of the present invention incorporates two values of the radius R, i.e. $R_1$=2 and $R_2$=4, as will be described below.

The spherical summation operator is the fundamental computation of the detector. The purpose of the operator is to compute the sum of voxel values within a given distance of a specified point. Let a voxel be located at (x, y, z), the distance be R, and voxels be obtained from a set of input masks denoted by M.

The first step is to identify the set of voxel locations to be included in the summation. Let a voxel located within the distance be represented by t=(a, b, c), and the set of voxels be denoted as T. That is, $$T = \{t: \sqrt{(x-a)^2 + (y-b)^2 + (z-c)^2} < R$$

$$t = (a, b, c)$$

Then, the spherical summation may be written as $$S_R(x, y, z) = \sum_{t \in T} M(t)$$

Figure 4:
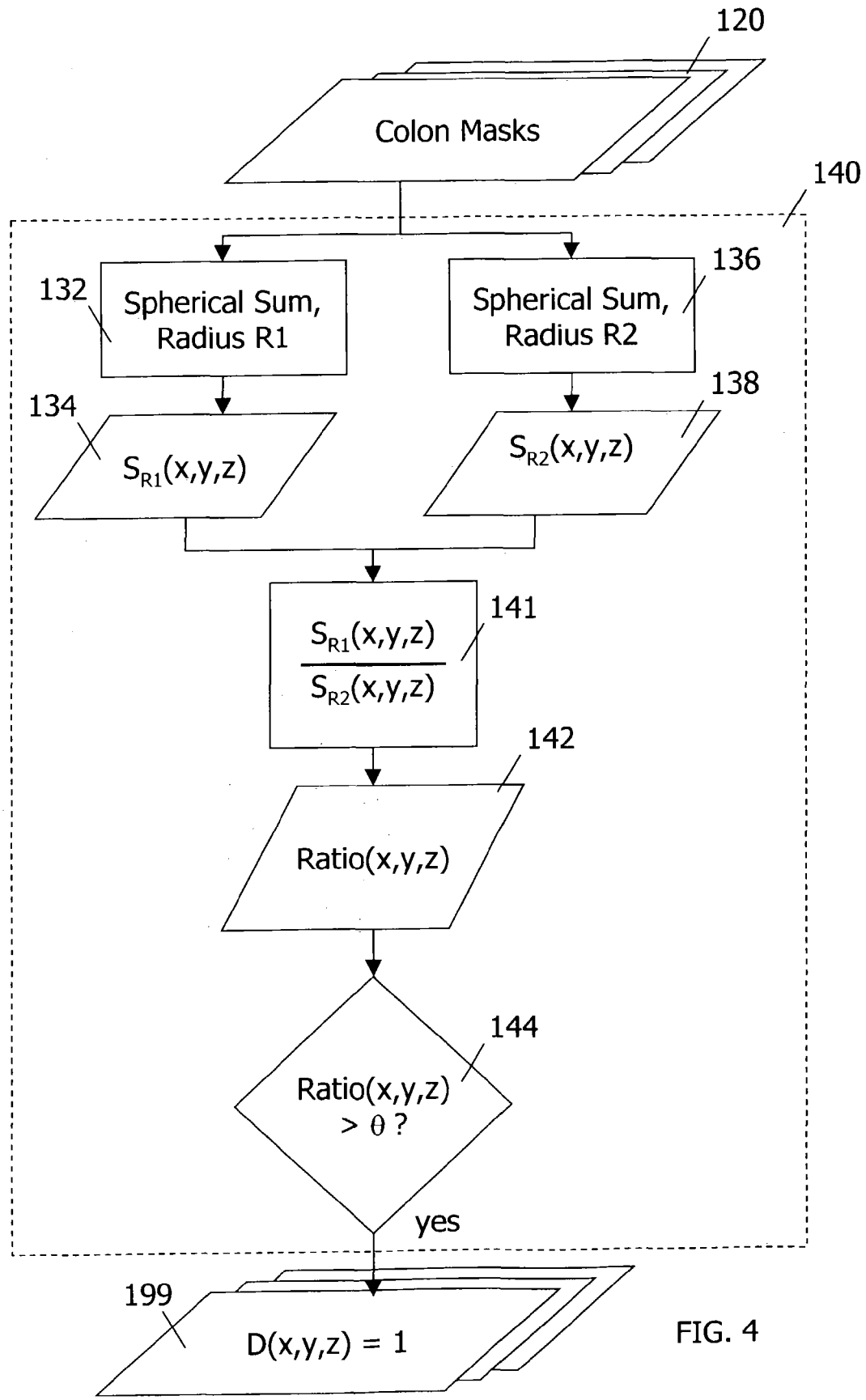
FIG. 4 is a detailed block diagram of the abnormality detector incorporating the spherical summation operator.

FIG. 4 shows a block diagram illustrating the detection method. Detection begins by operating on the set of colon masks, 120. Each colon mask has pixel values of −1 at the air-filled regions inside the colon. Correspondingly, pixel values of +1 represent regions of tissue outside the colon. In step 132, the spherical summation operator is applied with a predetermined radius, $R_1$, at the voxel location (x, y, z), producing the spherical sum, $S_{R1}$(x, y, z), 134. In step 136 the spherical summation operator is applied with a predetermined radius, $R_2$, at the voxel location (x, y, z), producing the spherical sum $S_{R2}$(x, y, z), 138. In step 141, $S_{R1}$(x, y, z) is divided by $S_{R2}$(x, y, z) to produce Ratio(x, y, z), 142. In step 144, the value of the ratio is compared to a predetermined threshold value, θ, to determine if the voxel associated with location (x, y, z) should be considered a detection. The spherical summation is computed for all (x, y, z) of the input imagery.

A set of initial detections, 199, is created as follows. First, an output array corresponding to the detection images is initialized such that all voxels are turned 'OFF'. Then, if the value of Ratio(x, y, z), is greater than 0, the voxel at location (x, y, z) in the output array is set to 'ON'. Preferred values for predetermined parameters are: $R_1$=4; $R_2$=2, and θ=55.

Example Outputs

Figure 5:
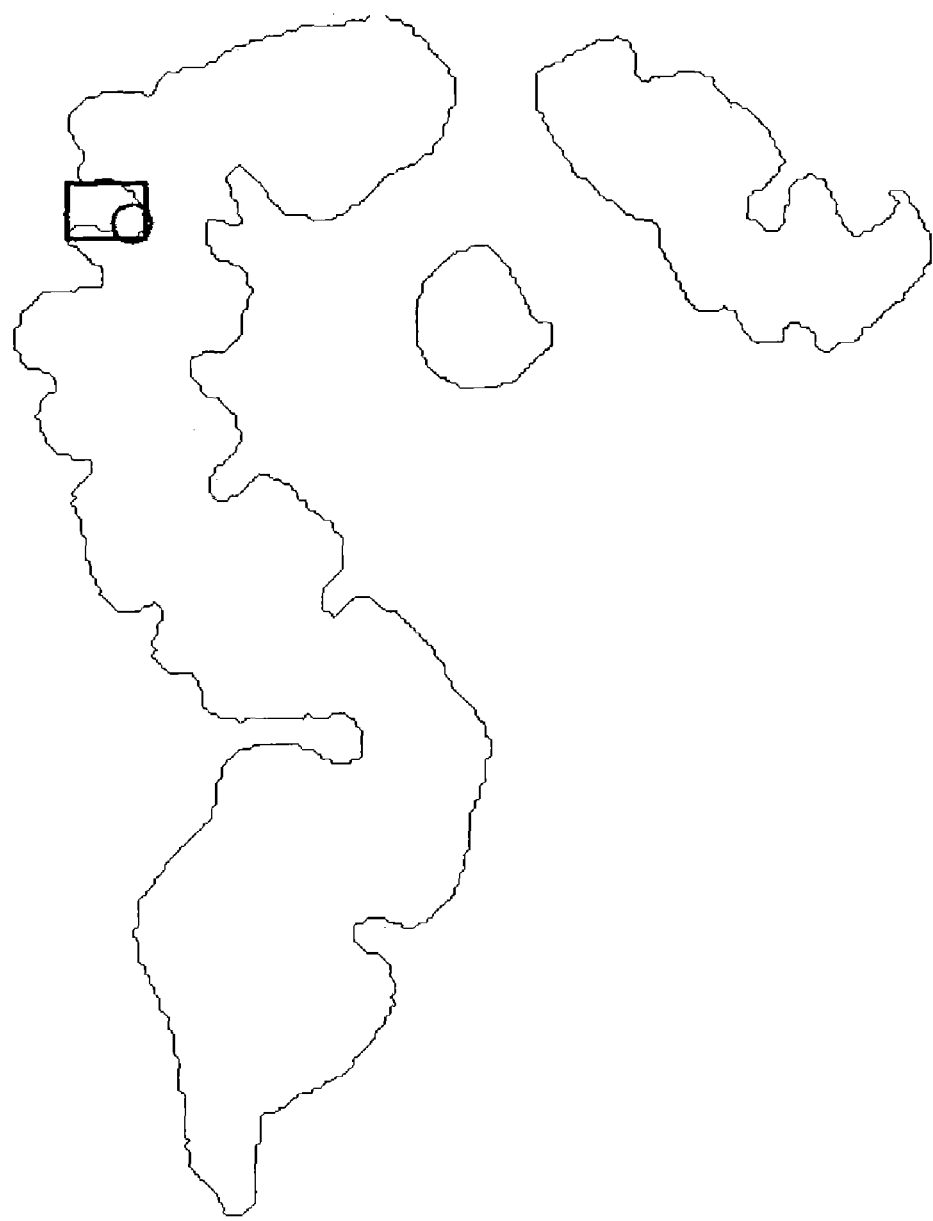
FIGS. 5-7 illustrate example outputs from the abnormality detector.
Figure 6:
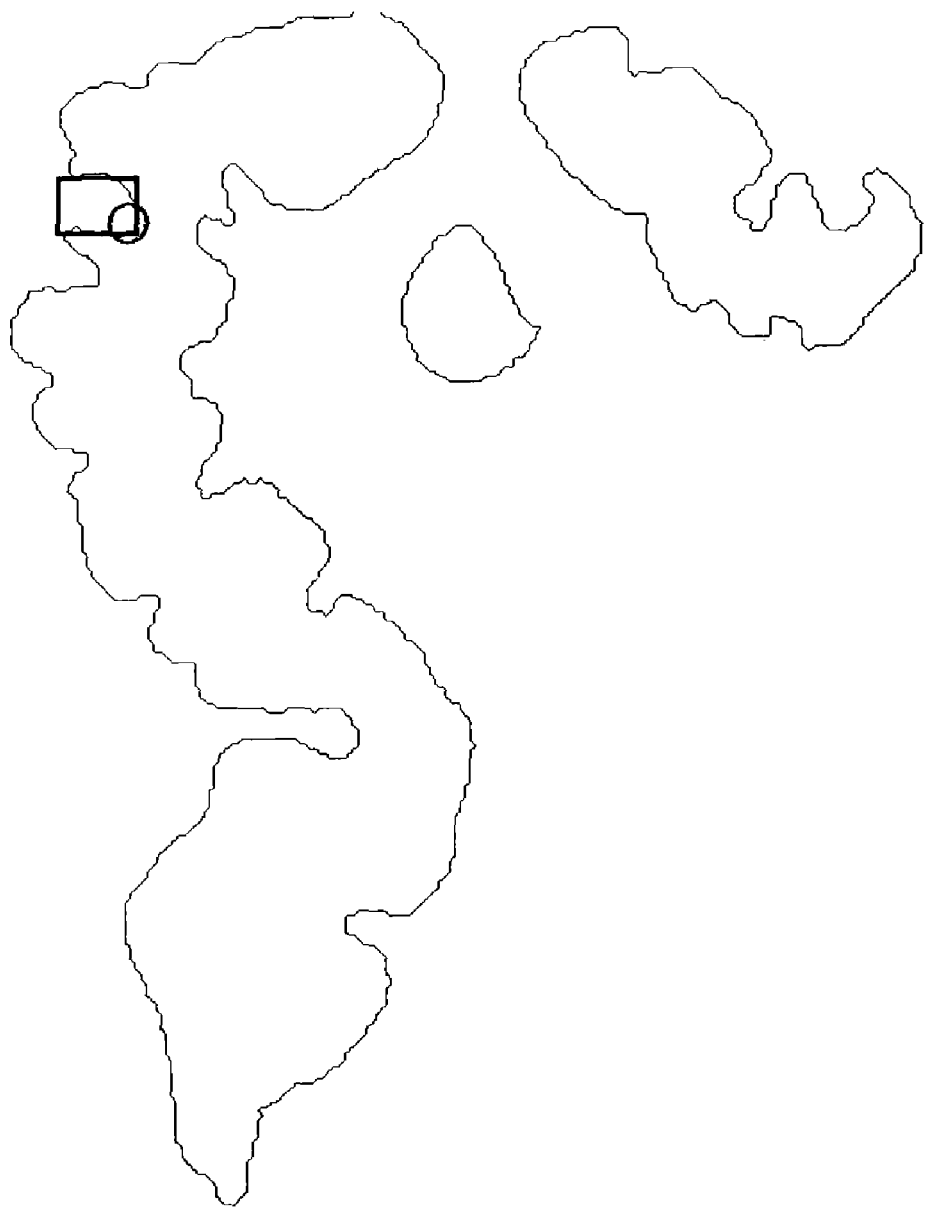
Figure 7:
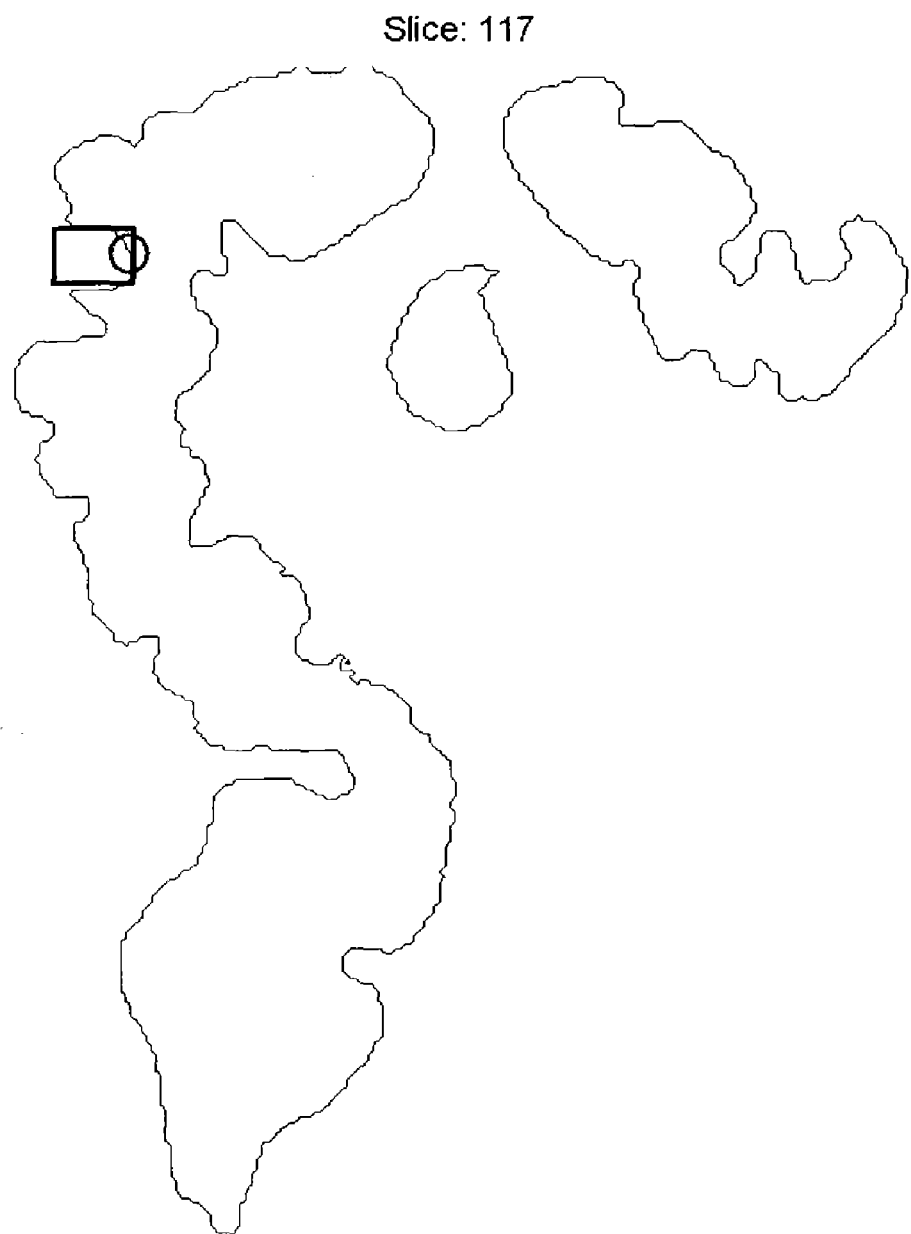

To demonstrate the utility of the present invention, FIGS. 5-7 show a set of detector outputs on transverse slices from CT imagery. The outline of the colon is divided into three objects on these slices. Separate objects appear in these transverse views due to vertical trajectories of the colon. Circles represent detections found by the method of the present invention and rectangles represent areas of visually identified polyps. The utility of the present invention is confirmed by noting detections within regions identified as polyps.

What is claimed is:

1. A method of detecting abnormalities in digital imagery comprising the steps of:

providing a set of binary images derived from a plurality of slice images representing cross-sections through a body;

performing a first spherical summation operation as a function of voxel locations in said set of images over a spherical region of a first radius to provide a first spherical summation value;

performing a second spherical summation operation as a function of said voxel locations in said set of images over a spherical region of a second radius to provide a second spherical summation value;

computing a ratio of said first spherical summation value to said second spherical summation value; and comparing said ratio to a threshold value and creating a set of detection images by turning voxels ON which exceed said threshold value.

2. The method of claim 1 wherein said first spherical operation is performed over a spherical region of a first radius and said second spherical operation is performed over a spherical region of a second radius less than said first radius.

3. The method of claim 1 wherein said slice images comprise binary masks.

4. The method of claim 3 wherein said binary masks result from segmentation of said slice images.

5. The method of claim 4 wherein said segmentation corresponds to identification of an object within a body.

6. The method of claim 5 wherein said binary mask has values of −1 inside said object and values of +1 outside said object.

7. The method of claim 5 wherein said object comprises a colon.

8. The method of claim 6 wherein said object comprises a colon.

9. The method of claim 1 wherein said abnormalities comprise polyps in a colon.

10. A system of detecting abnormalities in digital imagery, the system comprising:
   a set of binary images derived from a plurality of slice images representing cross-sections through a body;
   a detector, wherein said detector performs a first spherical summation operation as a function of voxel locations in said set of images over a spherical region of a first radius to provide a first spherical summation value, performs a second spherical summation operation as a function of said voxel locations in said set of images over a spherical region of a second radius to provide a second spherical summation value, computes a ratio of said first spherical summation value to said second spherical summation value, compares said ratio to a threshold value and creates a set of detection images by turning voxels ON which exceed said threshold value.

11. The system of claim 10 wherein said first spherical operation is performed over a spherical region of a first radius and said second spherical operation is performed over a spherical region of a second radius less than said first radius.

12. The system of claim 10 wherein said slice images comprise binary masks.

13. The system of claim 12 wherein said binary masks result from segmentation of computed tomography imagery.

14. The system of claim 12 wherein said binary masks result from segmentation of said slice images.

15. The system of claim 14 wherein said segmentation corresponds to identification of an object within a body.

16. The system of claim 15 wherein said binary mask has pixel values of −1 inside said object and pixel values of +1 outside said object.

17. The system of claim 15 wherein said object comprises a colon.

18. The system of claim 16 wherein said object comprises a colon.

19. The system of claim 10 wherein said abnormalities comprise polyps in a colon.

20. The system of claim 10 comprises a computer-aided detection system.

* * * * *